W. H. JAMES.
ELECTROCHEMICAL TREATMENT OF METAL BEARING MATERIAL
APPLICATION FILED SEPT. 6, 1913.
1,184,456.
Patented May 23, 1916.
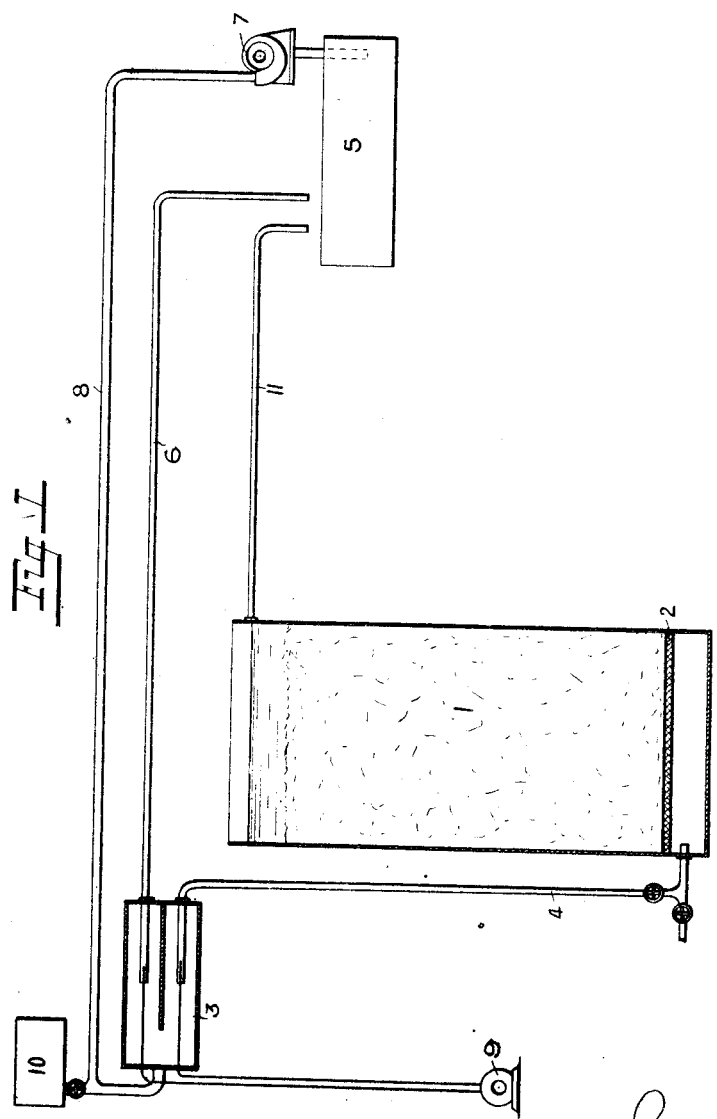

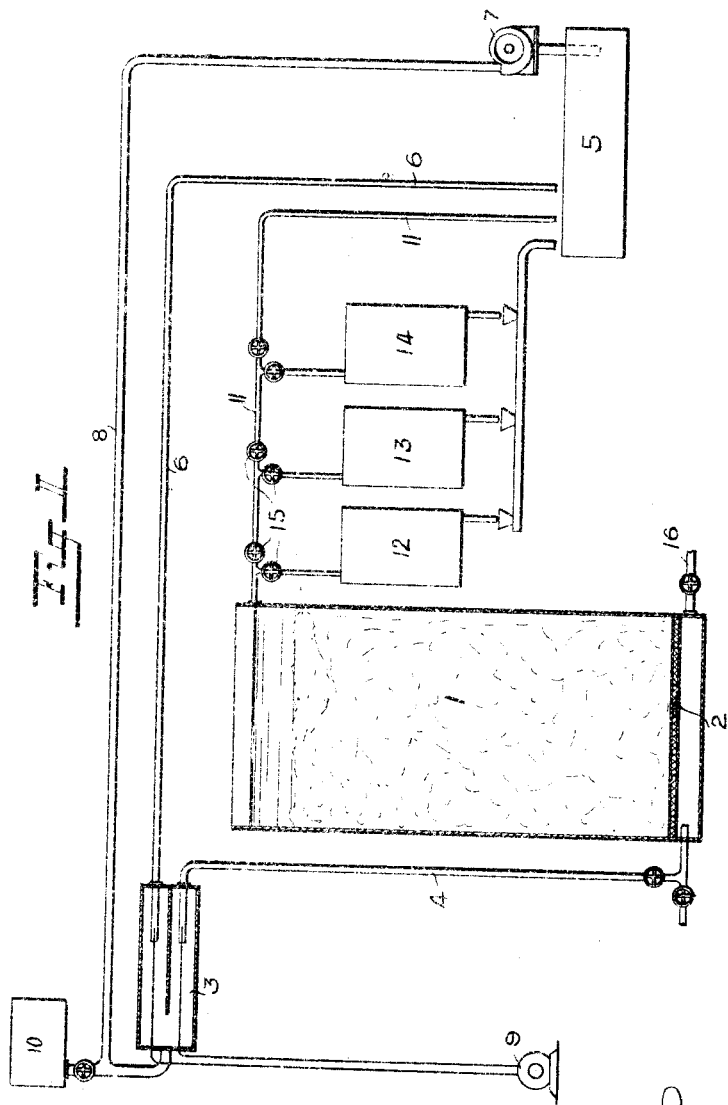

UNITED STATES PATENT OFFICE.

WILLIAM HOLMAN JAMES, OF JOHANNESBURG, TRANSVAAL, SOUTH AFRICA, ASSIGNOR, BY MESNE ASSIGNMENTS, TO NEW REFRACTORY ORES LIMITED, OF JOHANNESBURG, TRANSVAAL, SOUTH AFRICA, A COMPANY REGISTERED UNDER THE LAWS OF THE ORANGE FREE STATE.

ELECTROCHEMICAL TREATMENT OF METAL-BEARING MATERIAL.

1,184,456.  Specification of Letters Patent.  Patented May 23, 1916.

Application filed September 6, 1913. Serial No. 788,447.

*To all whom it may concern:*

Be it known that I, WILLIAM HOLMAN JAMES, a subject of the King of Great Britain, residing at Village Main Reef Gold Mine, Johannesburg, Province of the Transvaal, Union of South Africa, have invented a new and useful Improvement in the Electrochemical Treatment of Metal-Bearing Material; and I do hereby declare the following to be a full, clear, and exact description of the same.

The present invention consists in a process for treating refractory precious metal ores, whereby gold and silver ores which at present cannot be treated profitably by the ordinary cyanid process for extracting those metals may have their refractory constituents removed and thereby be made amenable to said known method.

By refractory precious metal ores is meant precious metal ores which contain cyanid-consuming substances other than gold and silver in such quantities that, upon direct treatment with cyanid, the consumption of cyanid is unprofitably high. Typical ores are those containing copper, graphitic matter or large proportions of marcasite or magnetic iron pyrite.

According to the invention a salt of a mineral acid is electrolyzed in an electrolyzer which permits the ionized liquid produced at each electrode to be drawn off separately. One of such portions of the liquid is passed, preferably directly and without exposure, to the refractory ore and the latter is treated therewith. Its effect upon the ore is to dissolve those metalliferous substances which make the ore refractory. After the ore has been treated for a sufficient time to dissolve the refractory metallic constituents the solution is withdrawn, leaving the ore amenable to the ordinary cyanid or other process of gold or silver extraction. The liquid employed has a preferential action on the refractory substances and practically no precious metal is dissolved so long as refractory substances are present. Certain refractory substances such as graphite, though not dissolved are liberated from the ore upon the dissolution of the other refractory substances with which they occur. They are removed in any suitable manner; for instance graphite may float to the surface of the liquid and may be skimmed off.

As a rule the acid electrolytic product which appears at the anode is used for treating the ore; but in some cases, *e. g.* when arsenic is the principal refractory constituent, it is preferable to use the alkaline cathode product.

Preferably the portion of the solution which has treated the metal bearing material is mixed with the other portion of the solution which was withdrawn from the neighborhood of the other electrode of the electrolyzer, thereby regenerating the original solution which may be returned to the electrolyzer thus making the process cyclic.

The refractory metal constituent which has gone into solution may be recovered by treating, in any appropriate manner, the liquid with which the ore has been treated; or it may be left in said liquid and recovered in the form of the precipitate which results from the regenerative mixing of the two portions of the solution as aforesaid.

The accompanying drawings illustrate diagrammatically apparatus for carrying out the process.

Figure 1 shows a complete apparatus in its simplest form and Fig. II a modified form thereof.

1 is the vat or other suitable vessel for the metal bearing material. It is provided with a filter floor 2, or other suitable means for distributing solution into it. 3 is the electrolyzer from which is drawn by pipe 4 the part of the electrolyzed solution with which it is desired to treat the metal bearing material in the vat 1. Said solution is distributed throughout the metal bearing material, as by upward percolation from the filter floor 3, and after contact with such material for the desired period the solution is withdrawn from vat 1 and may be passed to sump 5. To said sump 5 is also passed, by pipe 6, the part of the solution drawn from the neighborhood of the other electrode of the electrolyzer. Mixture of the two solutions in sump 5 results in the precipitation of metallic contents extracted by the solution from the material in vat 1; and the resultant neutral solution is returned by pump 7 and pipe 8 to the electrolyzer 3.

9 is a source of supply of electrical energy to electrolyzer 3.

In carrying the invention into effect, it is preferred to supply the electrolyzer with sodium chlorid solution, which may be fed in from the supply tank 10. The current from source 9 ionizes the solution, and the portion of the latter in the vicinity of the anode is withdrawn in the nascent state by pipe 4.

The ore in vat 1, which may be a raw gold ore containing unaltered iron, copper or other metal compounds, is attacked by the solution brought in by pipe 4. The base metals are dissolved and passed off in solution by pipe 11 direct to sump 5, as in Fig. I, or suitable apparatus for the recovery of its metal value before it arrives at sump 5. Such apparatus is indicated in Fig. II by boxes 12, 13, 14 controlled by suitable valves 15. In sump 5 the solution meets with the sodium-containing solution passed from electrolyzer 3 by pipe 6. Mixture of these solutions tends, by neutralizing them, to precipitate any metal remaining in the solution which was passed through vat 1. The neutralized solution is thereafter passed by pump 7 and pipe 8 back to the electrolyzer 3 and the cycle is completed.

When sufficient of the refractory constituent of the ore in vat 1 has been dissolved out as above described, to render the gold amenable to the ordinary extraction processes, the circulation of the solution through vat 1 is stopped and the solution remaining in it is replaced by cyanid or other solution for the recovery of the gold. Said latter solution may be admitted by pipe 16. The pregnant cyanid or other solution may be made to leave the vat by pipe 11 and the valves 15, which are so set as to cause it to pass through a suitable box, such as 13, containing zinc, aluminium or other substance for the precipitation of its gold contents.

What I claim is:—

1. The process of treating refractory precious metal ore of the nature hereinbefore described, which consists in electrolyzing a solution of a salt of a mineral acid, withdrawing separately from the electrolytic circuit the portion of the solution in the vicinity of one of the electrodes, treating the ore therewith until the refractory constituents are dissolved and removing the solution and with it the refractory constituents, whereby the ore is left amenable to the ordinary cyanid process for the extraction of the precious metal.

2. The process of treating refractory precious metal ore of the nature hereinbefore described, which consists in electrolyzing a solution of a salt of a mineral acid, withdrawing separately from the electrolytic circuit the portion of the solution in the vicinity of the anode, treating the ore therewith until the refractory constituents are dissolved and removing the solution and with it the refractory constituents, whereby the ore is left amenable to the ordinary cyanid process for the extraction of the precious metal.

3. The process of treating refractory precious metal ore of the nature hereinbefore described, which consists in electrolyzing a solution of sodium chlorid, withdrawing separately from the electrolytic circuit the portion of the solution in the vicinity of the anode, treating the ore therewith until the refractory constituents are dissolved and removing the solution and with it the refractory constituents, whereby the ore is left amenable to the ordinary cyanid process for the extraction of the precious metal.

In testimony whereof I affix my signature in presence of two witnesses.

WILLIAM HOLMAN JAMES.

Witnesses:
 WESLEY E. JOHN,
 CHARLES B. HENDERSON.